(12) United States Patent
Paxton

(10) Patent No.: US 7,985,042 B1
(45) Date of Patent: Jul. 26, 2011

(54) THREAD CAGE RETAINER

(75) Inventor: Peter M. Paxton, Auburn Hills, MI (US)

(73) Assignee: Fourslides Inc., Madison Heights, MI (US)

( * ) Notice: Subject to any disclaimer, the term of this patent is extended or adjusted under 35 U.S.C. 154(b) by 342 days.

(21) Appl. No.: 12/290,364

(22) Filed: Oct. 31, 2008

(51) Int. Cl.
*F16B 37/02* (2006.01)
(52) U.S. Cl. .................... 411/527; 411/437; 411/520
(58) Field of Classification Search .................. 411/433, 411/437, 520, 525–529, 521, 523
See application file for complete search history.

(56) References Cited

U.S. PATENT DOCUMENTS

| | | | |
|---|---|---|---|
| 1,638,165 A | 8/1927 | Rau | 411/419 |
| 1,771,522 A * | 7/1930 | Berge | 138/96 T |
| 2,110,959 A | 3/1938 | Lombard | 411/447 |
| 2,279,169 A * | 4/1942 | Kost | 411/527 |
| 2,364,668 A * | 12/1944 | Simmons | 411/437 |
| 2,377,694 A * | 6/1945 | Judd | 411/524 |
| 2,378,957 A * | 6/1945 | Tinnerman | 411/437 |
| 2,401,672 A | 6/1946 | Tinnerman | 85/32 |
| 2,539,172 A * | 1/1951 | Andrews | 248/27.3 |
| 2,549,393 A | 4/1951 | Siesel | 411/419 |
| 3,099,184 A | 7/1963 | McCauley, Jr | 411/411 |
| 3,115,804 A | 12/1963 | Johnson | 411/338 |
| 3,215,025 A | 11/1965 | Kramer | 85/35 |
| 3,395,602 A * | 8/1968 | Strange | 411/437 |
| 4,060,020 A | 11/1977 | Poliak | 411/417 |
| 4,165,673 A | 8/1979 | Shue et al. | 411/176 |
| 4,435,111 A * | 3/1984 | Mizusawa | 411/437 |
| 4,600,344 A | 7/1986 | Sutenbach et al. | 411/435 |
| 4,671,717 A * | 6/1987 | Fukuhara | 411/182 |
| 4,850,778 A | 7/1989 | Clough et al. | 411/433 |
| 4,990,044 A | 2/1991 | Kiuak | 411/427 |
| 5,110,246 A | 5/1992 | Fisher et al. | 411/429 |
| 6,612,796 B2 * | 9/2003 | Gattone | 411/520 |

* cited by examiner

*Primary Examiner* — Flemming Saether
(74) *Attorney, Agent, or Firm* — Renner, Kenner, Greive, Bobak, Taylor & Weber

(57) ABSTRACT

A thread cage retainer includes a base having an opening to allow for the passage of a threaded fastener. The retainer also has a plurality of arcuately shaped tabs that extend from the base around the opening a circumferential extent to form a channel for receiving the threaded fastener. Each tab includes at least one engaging member that projects inwardly from a portion of the circumferential extent of each tab.

6 Claims, 6 Drawing Sheets

THREAD CAGE RETAINER

TECHNICAL FIELD

The present invention relates generally to a retainer used to fasten two components together. For example, the retainer may be used to secure heat shields or wire/hose clamps to the surfaces inside the engine compartment of an automobile. More particularly, the present invention relates to such a retainer which is installed by pushing it on a threaded stud and yet which may be twisted off to be removed enabling the retainer to be quickly inserted onto, yet securely retained around, a threaded stud thereby preventing the retainer from being pulled off of the threaded stud.

BACKGROUND ART

Automotive manufacturers constantly look for innovative ways to reduce vehicle cost, without sacrificing quality. One widely known strategy is to lower cost by reducing production time. Accordingly, manufacturers apply clips rather than fasteners such as screws, bolts, nuts, or the like for securing various components throughout the interior and exterior of the vehicle. It is well known that nuts have been used to secure heat shields to various metallic and non-metallic surfaces. However, for every nut used in such a manner, time is required to install the nuts into position. In fact, given the tight confines of an engine compartment, providing the required twisting action to the nut can be extremely difficult. As a result, there is a need for a thread cage retainer that can be quickly inserted, yet securely retained on, a threaded stud. Such a retainer should simulate a nut, and require a twisting action for removal, but should also advantageously eliminate the time required to secure a conventional nut into position.

There have been several attempts to create such devices, however, they lack structure which guarantees appropriate alignment and heat properties provided by steel. One such device is disclosed in U.S. Pat. No. 5,110,246. This patent discloses a fastener that has a cap and a set of teeth at the base. Although the fastener disclosed is beneficial, it lacks versatility because it cannot be used on varying heights of threaded studs. Another disadvantage of this fastener is that the closed cap structure prevents any expansion other than that of the engaging teeth.

Another device is disclosed in U.S. Pat. No. 4,990,044. Although effective for its intended purposes, this retainer lacks the ability to be used in heat applications based on the materials disclosed in the specification. Furthermore, this device includes an internally threaded nut portion peripherally split in an axial direction to permit radial expansion. Although this configuration is beneficial, there exists a need to provide a decreased installation force where only a portion of the engaging surface communicates with the threads of a threaded stud.

As a result, there is a need for a retainer that can be quickly inserted, yet securely retained on, a threaded stud. Such a retainer should simulate a nut and require a twisting action for removal, but should also advantageously eliminate the time required to secure a conventional nut into position.

DISCLOSURE OF THE INVENTION

Therefore, it is an object of one aspect of the present invention to provide a retainer which is pushed onto a threaded stud to be installed and yet which must be twisted off to be removed.

It is another object of one aspect of the present invention to provide a retainer, as above, which is intended to replace conventional nuts.

It is a further object of one aspect of the present invention to provide a retainer, as above, which is used to fasten two components together, or more specifically, which may be used to secure heat shield or wire/hose clamps to the surfaces inside the engine compartment of an automobile.

It is still another object of one aspect of the present invention to provide a retainer, as above, wherein the push-on and twist-off features enable the retainer to be quickly installed onto, yet securely retained about, a threaded stud.

It is still another further object of one aspect of the present invention to provide a retainer, as above, wherein the push-on and twist-off features prevent the retainer from being pulled off of the threaded stud.

It is still a further object of one aspect of the present invention to provide a retainer, as above, wherein the push-on and twist-off features require a twisting action to remove the retainer from the threaded stud.

These and other aspects of the present invention, as well as the advantages thereof over existing prior art forms, which will become apparent from the description to follow, are accomplished by the improvements hereinafter described and claimed.

In general, a retainer made in accordance with the concepts of the present invention includes a base having an opening to allow for the passage of a threaded fastener. The retainer also has a plurality of arcuately shaped tabs that extend from the base around the opening a circumferential extent to form a channel for receiving the threaded fastener. Each tab includes at least one engaging member that projects inwardly from a portion of the circumferential extent of each tab.

A preferred exemplary push-on twist-off retainer incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
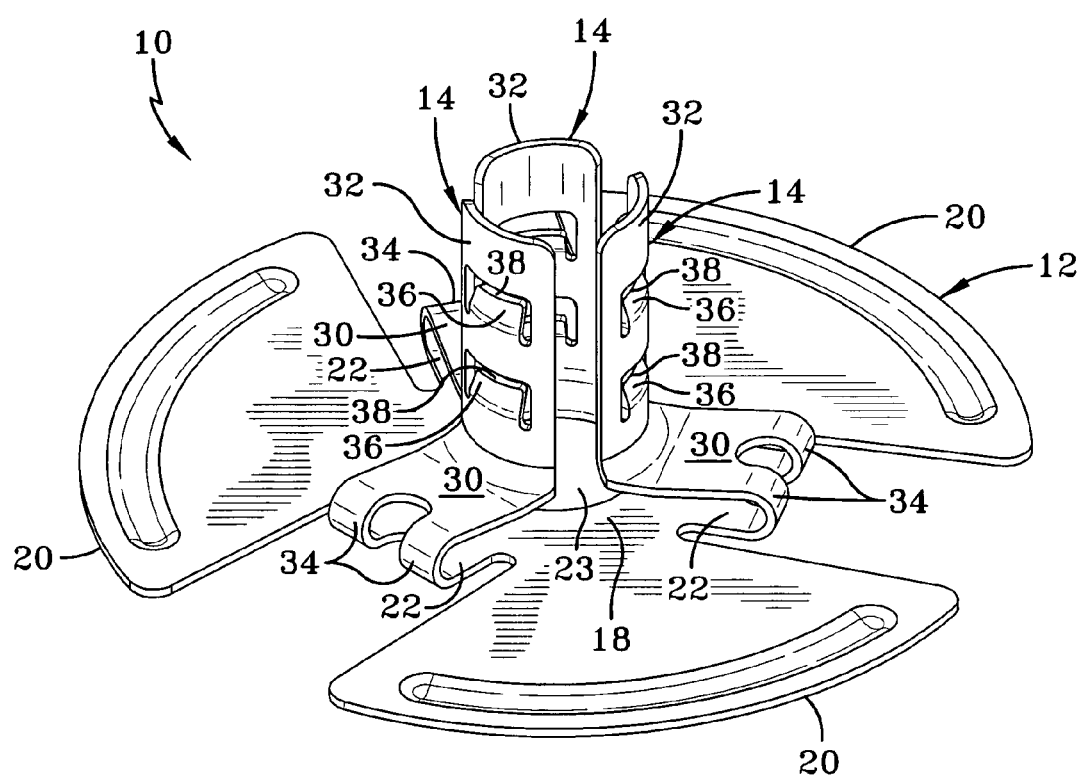
FIG. 1 is a perspective view of a thread cage retainer made in accordance with the concepts of the present invention.
Figure 2:
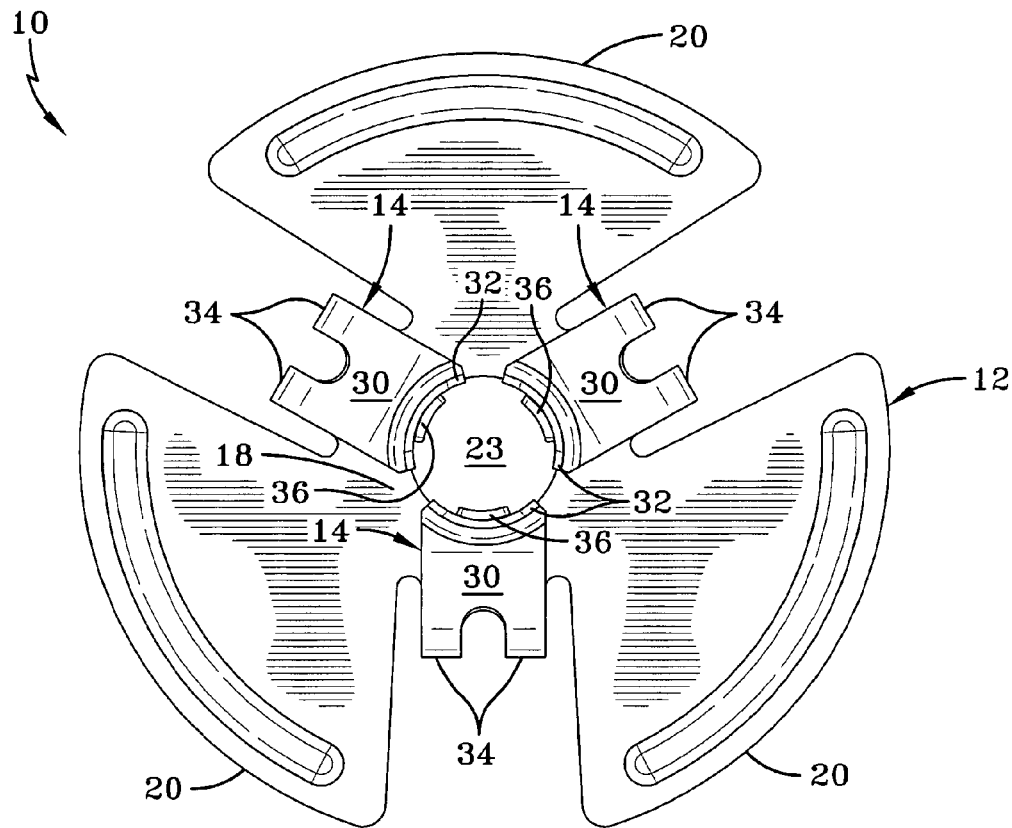
FIG. 2 is a top plan view thereof.
Figure 3:
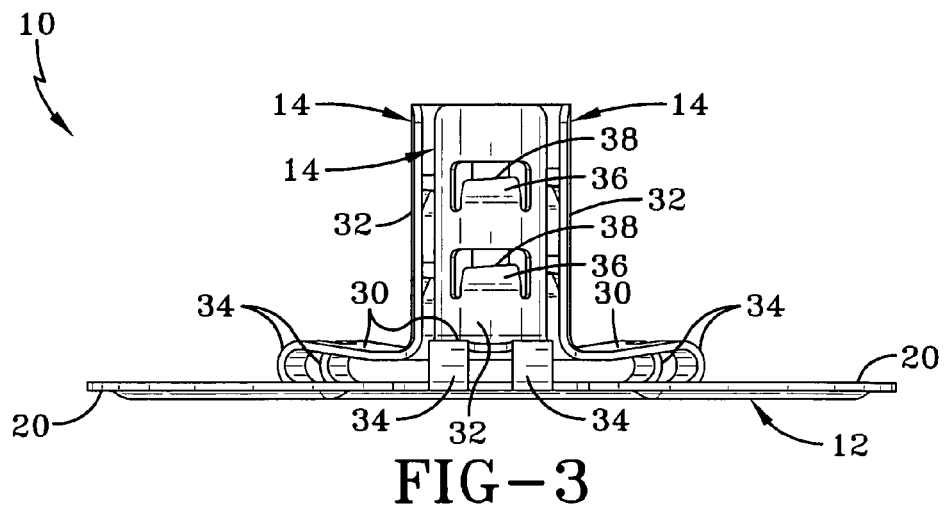
FIG. 3 is a side elevational view thereof.
Figure 4:
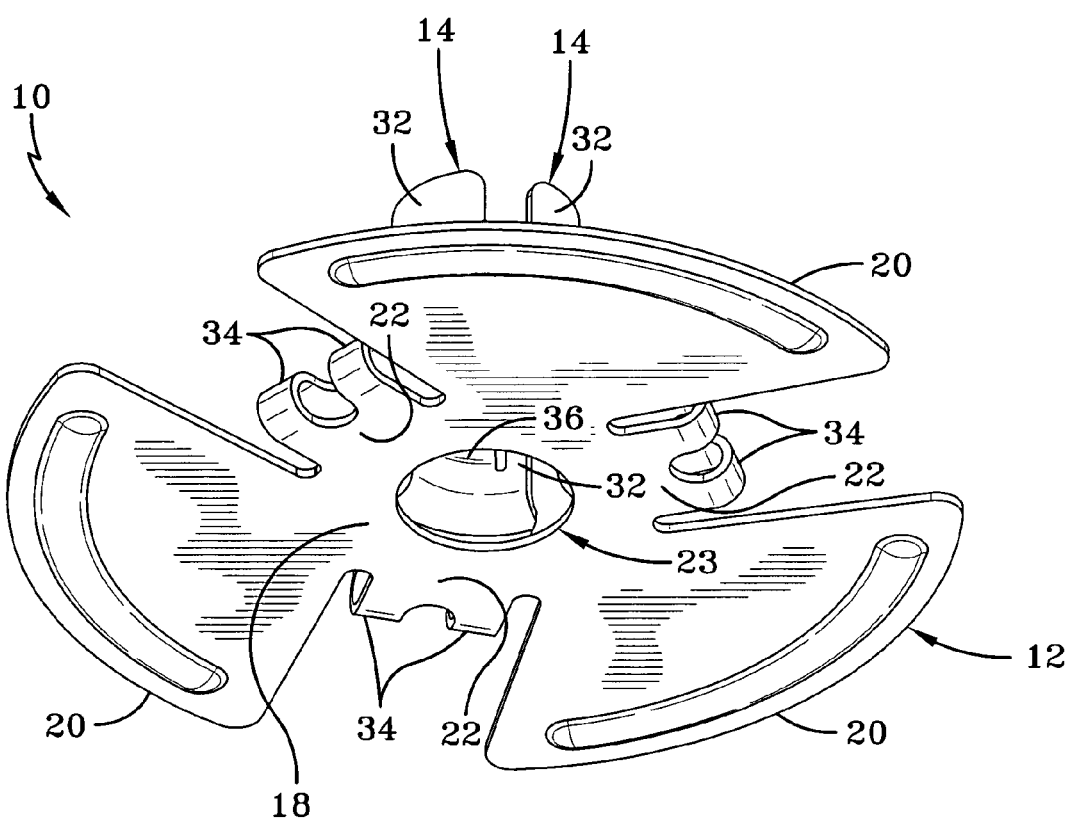
FIG. 4 is a bottom perspective view thereof.

A thread cage retainer made in accordance with the present invention is generally indicated by the numeral 10. In the preferred embodiment, thread cage retainer 10 is of unitary construction, formed as a single body from a blank sheet of metal by conventional metal stamping techniques. However, other materials such as plastic may be utilized, formed by conventional manufacturing techniques such as injection molding.

Thread cage retainer 10 is generally configured to have a base 12 and a series of L-shaped tabs 14. The base 12 includes central hub 18, blades 20, and tab supports 22. Central hub 18 has an opening 23, which is located concentrically thereof. Blades 20 and tab supports 22 extend outwardly from hub 18, and tab supports 22 are positioned between blades 20. Base 12 serves to bear against a flat surface of a structure to which the retainer 10 secures onto a threaded stud.

Each L-shaped tab 14 includes a foot portion 30 and a leg portion 32. One end of each foot portion 30 is attached to a leg portion 32 and the other end is attached to one end of rolled junctions 34, which at their other end is attached to tab supports 22. Leg portions 32 extend upwardly from foot portions 30 above the base 12, and are generally equally spaced from each other.

Leg portions 32 are arcuately shaped and are circumferentially arranged about opening 23 to form a channel that receives a threaded stud. Leg portions 32 are provided with thread-interfacing barbs 36. Barbs 36 are disposed axially one above the other on the inside surfaces of each leg portion 32. Barbs 36 may be formed as perforations in leg portions 32 bent inwardly therefrom to form wedge-like shapes having arcuately shaped distal ends 38 that extend for a portion along the radius of each leg portion 32.

Figure 5:
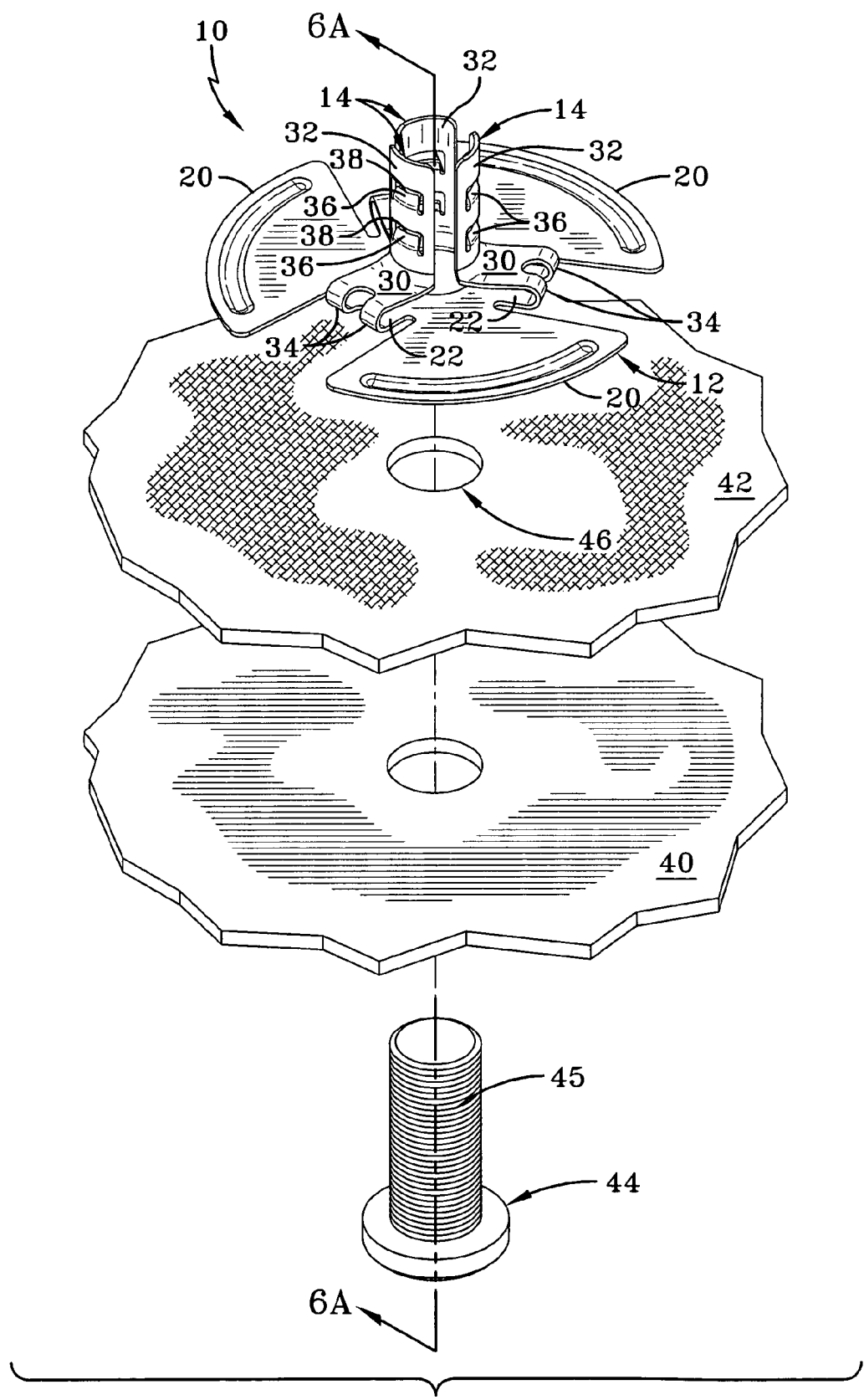
FIG. 5 is an exploded, fragmented, perspective view of the thread cage retainer shown with the mating surfaces and threaded fastener.
Figure 6A:
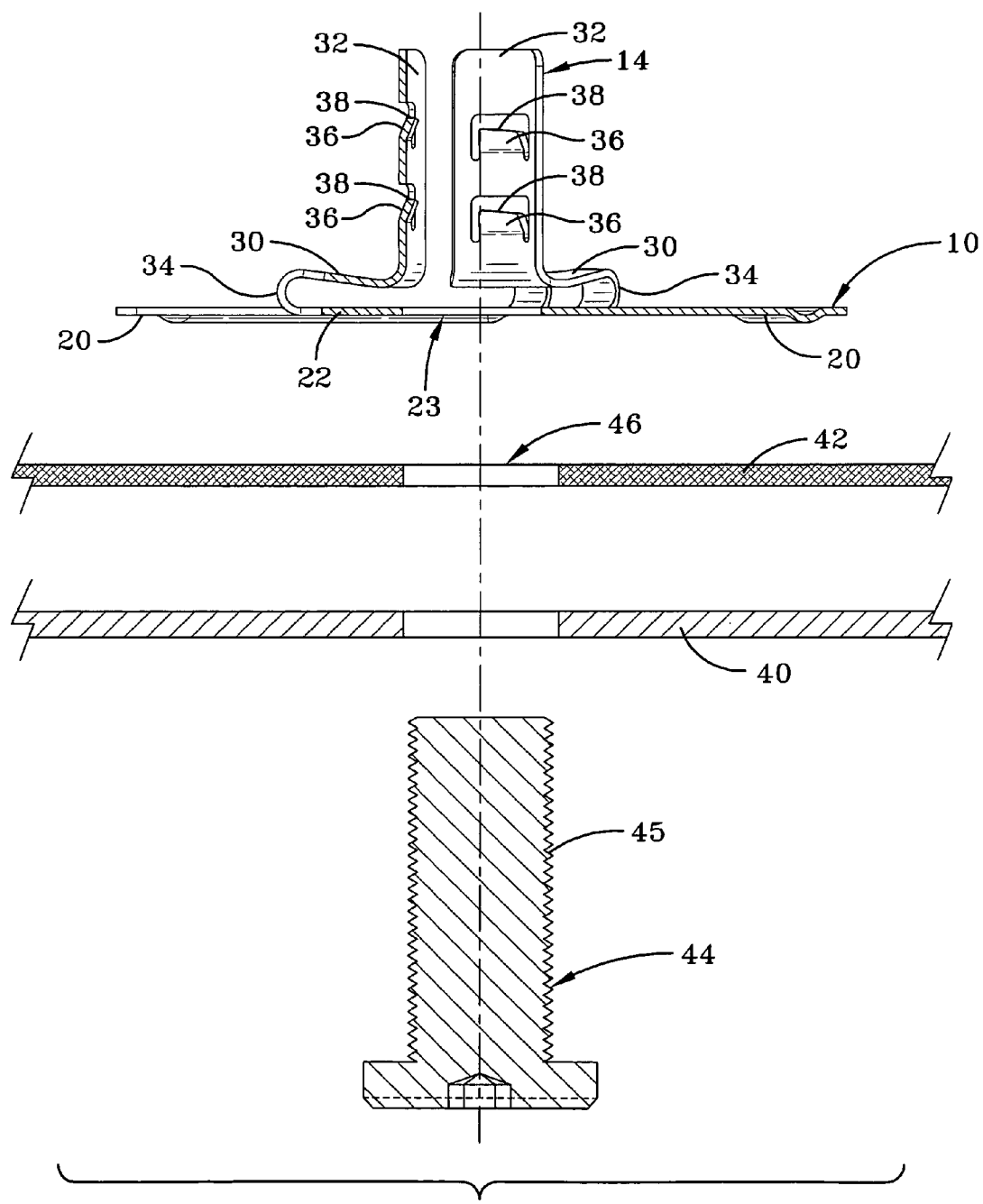
FIG. 6A is a sectional view taken substantially along line 6A-6A of FIG. 5.
Figure 6B:
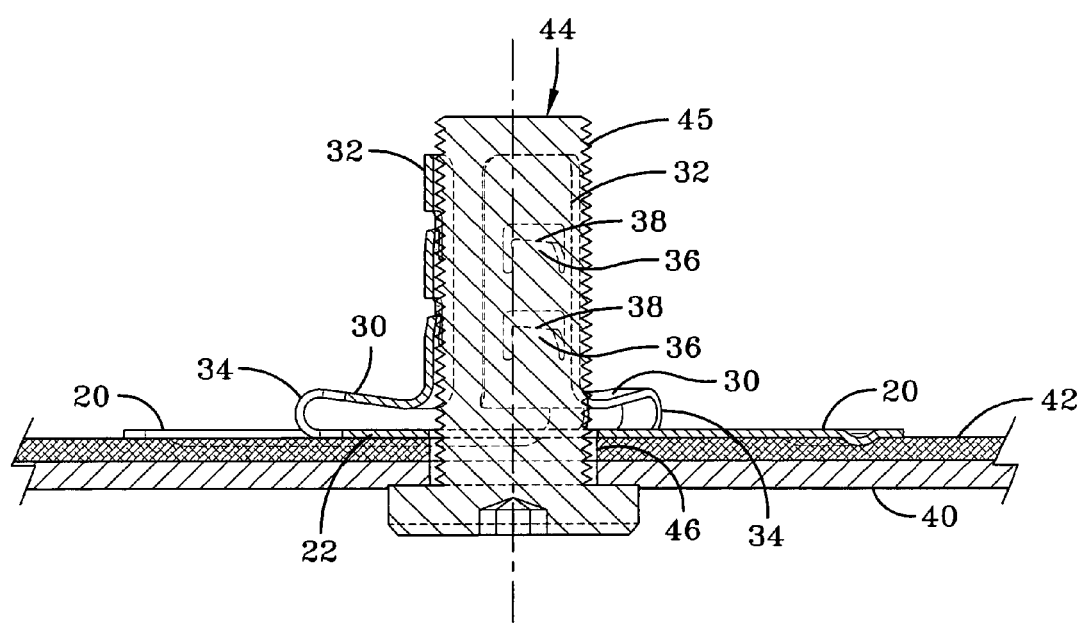
FIG. 6B is a sectional view taken substantially along line 6A-6A of FIG. 5, but showing the components assembled together.

As seen in FIGS. 5-6, a thread cage retainer 10 can be used to secure a wall structure 40 and an overlapping structure 42 together. For example, the overlapping structure 42 could be heat shields or wire/hose clamps, and the wall structure 40 could be the surfaces inside the engine compartment of an automobile. Wall structure 40 is provided with a threaded stud 44 having threads 45, and the overlapping structure 42 includes a hole 46. The overlapping structure 42 can be positioned against the wall structure 40 such that the hole 46 surrounds the threaded stud 44. Retainer 10 can be pushed onto the threaded stud 44 to affix overlapping structure 42 to the wall structure 40. It is the arrangement of barbs 36 and the cantilevered nature of the L-shaped tabs 14 that provides for the push-on and twist-off nature of retainer 10.

To install retainer 10, threaded stud is positioned in retainer opening 23. The retainer 10 is then pushed downwardly at blades 20 causing leg portions 32 to slide over and contact threaded stud 44. Barbs 36 do not resist movement of thread cage retainer 10 in the direction of insertion because as leg portions 32 are installed onto threaded stud 44, the interaction between threads 45 and the wedge-like shape of barbs 36 cause leg portions 32 to further expand. Such expansion allows barbs 36 to slide over threads 45 as thread cage retainer 10 is installed onto threaded stud 44.

Barbs 36 prevent thread cage retainer 10 from being pulled off of threaded stud 44 because distal ends 38 of barbs 36 engage threads 45 of stud 44. As such, distal ends 38 of barbs 36 simulate threads of a nut, and prevent thread cage retainer 10 from being pulled off of threaded stud 44. As should be appreciated, twisting retainer 10 counterclockwise will remove thread cage retainer 10 from threaded stud 44. A set of pliers or manually turning the retainer 10 can effect such removal.

Thus, it should be evident that a device constructed as described herein accomplishes the objects of the invention and otherwise substantially improves the art.

What is claimed is:

1. A retainer integrally formed of steel and adapted to receive a threaded fastener, the retainer comprising a base having a hub, blades, tab supports, and an opening to allow for the passage of the fastener, a plurality of arcuately shaped tabs extending from said base around said opening a circumferential extent to form a channel to receive the threaded fastener, and rolled junctions, wherein each said tab includes at least one engaging member that projects inwardly from a portion of the circumferential extent of each said tab, said blades and said tab supports extending outwardly from said hub, said tab supports being positioned between said blades, and said rolled junction being interposed between said tab supports and said tabs.

2. A retainer according to claim 1, wherein each said engaging member has arcuately shaped distal ends.

3. A retainer according to claim 1, wherein each said tab includes a second engaging member disposed axially above said at least one engaging member.

4. A retainer according to claim 1, wherein said tabs are L-shaped.

5. A retainer according to claim 1, wherein said tabs expand as the retainer is pressed onto the threaded fastener and the engaging members preclude pulling the retainer off of the threaded fastener.

6. A retainer according to claim 1, wherein said tabs expand as the retainer is pressed onto the threaded fastener and the retainer can be rotated counterclockwise to remove the retainer from the threaded fastener.

* * * * *